(12) United States Patent
Zhu et al.

(10) Patent No.: US 12,058,395 B2
(45) Date of Patent: Aug. 6, 2024

(54) MEDIA MONITORING METHOD, APPARATUS AND SYSTEM

(71) Applicant: BOE Technology Group Co., Ltd., Beijing (CN)

(72) Inventors: Dan Zhu, Beijing (CN); Bingchuan Shi, Beijing (CN); Xingchen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/761,526

(22) PCT Filed: Apr. 27, 2021

(86) PCT No.: PCT/CN2021/090341
§ 371 (c)(1),
(2) Date: Mar. 17, 2022

(87) PCT Pub. No.: WO2022/226808
PCT Pub. Date: Nov. 3, 2022

(65) Prior Publication Data
US 2024/0064353 A1    Feb. 22, 2024

(51) Int. Cl.
*H04N 21/24* (2011.01)
*H04N 21/234* (2011.01)
*H04N 21/81* (2011.01)

(52) U.S. Cl.
CPC ... *H04N 21/2407* (2013.01); *H04N 21/23418* (2013.01); *H04N 21/812* (2013.01)

(58) Field of Classification Search
CPC ......... H04N 21/2407; H04N 21/23418; H04N 21/812; H04N 21/44008; H04N 21/4316; H04N 23/57
(Continued)

(56) References Cited

U.S. PATENT DOCUMENTS

2009/0257620 A1* 10/2009 Hicks ..................... H04N 21/24
382/100
2013/0132170 A1* 5/2013 Yelisetti ................. G06Q 30/02
705/14.4
(Continued)

FOREIGN PATENT DOCUMENTS

CN    102629484 A        8/2012
CN    103139657 A    *   6/2013
(Continued)

*Primary Examiner* — Cynthia M Fogg
(74) *Attorney, Agent, or Firm* — Workman Nydegger

(57) ABSTRACT

The present disclosure discloses a media monitoring method, apparatus and system. The method includes: obtaining image information of a program verification region in a display frame of a currently monitored display screen, wherein the program verification region is configured to display verification information corresponding to a current program that should be broadcast on the display screen; identifying the image information to determine actual display information representing a current actually-broadcast program; and performing verification on the actual display information according to the verification information, and determining that the display screen broadcasts normally if the verification is passed, or determining that the display screen does not broadcast normally if the verification is failed.

10 Claims, 6 Drawing Sheets

(58) Field of Classification Search
USPC .......................................................... 725/19
See application file for complete search history.

(56) References Cited

U.S. PATENT DOCUMENTS

| | | | |
|---|---|---|---|
| 2013/0232517 A1* | 9/2013 | Reis dos Santos | H04H 60/48 725/14 |
| 2017/0262994 A1* | 9/2017 | Kudriashov | G06T 7/136 |
| 2017/0346584 A1* | 11/2017 | De Laet | H04H 60/59 |
| 2018/0150871 A1 | 5/2018 | Adoni et al. | |
| 2019/0222885 A1* | 7/2019 | Cho | G06Q 30/0265 |

FOREIGN PATENT DOCUMENTS

| | | | | |
|---|---|---|---|---|
| CN | 105429905 | A | 3/2016 | |
| CN | 107578572 | A | 1/2018 | |
| CN | 109089173 | A | 12/2018 | |
| CN | 109413072 | A | 3/2019 | |
| CN | 109447676 | A | 3/2019 | |
| CN | 110020899 | A | 7/2019 | |
| CN | 110659717 | A * | 1/2020 | ............ G06M 11/00 |
| CN | 111597849 | A * | 8/2020 | ............ G06K 7/1443 |
| CN | 112565922 | A | 3/2021 | |
| CN | 113033233 | B * | 9/2023 | ............ G06K 7/1417 |
| KR | 20120107395 | A * | 10/2012 | |

\* cited by examiner

MEDIA MONITORING METHOD, APPARATUS AND SYSTEM

CROSS-REFERENCE TO RELATED APPLICATIONS

This application is a National Stage of International Application No. PCT/CN2021/090341, filed Apr. 27, 2021 which is hereby incorporated by reference in its entirety.

FIELD

The present disclosure relates to the field of media broadcast, in particular to a media monitoring method, apparatus and system.

BACKGROUND

Advertisements broadcast by media broadcast devices deployed at advertising positions in public places such as subway stations and shopping malls are broadcast according to a broadcast plan.

When a media device actually broadcasts, if it fails to broadcast according to the broadcast plan for various reasons, a huge loss will be brought to an operating company.

SUMMARY

In a first aspect, to solve the above technical problems, an embodiment of the present disclosure provides a media monitoring method. A technical solution of the method is as follows:

obtaining image information of a program verification region in a display frame of a display screen which is currently monitored, wherein the program verification region is configured to display verification information corresponding to a program that should be currently broadcast on the display screen;

identifying the image information to determine actual display information representing a current program in the display screen; and performing a verification on the actual display information according to the verification information, and determining that the display screen broadcasts normally in response to the verification being passed, or determining that the display screen does not broadcast normally in response to the verification being failed.

In some embodiments, the identifying the image information to determine the actual display information representing the current program includes:

detecting whether the image information contains a Quick Response, QR code;

parsing the QR code to obtain a parse result in response to the image information containing the QR code; and determining the parse result to be the actual display information.

In some embodiments, the detecting whether the image information contains the QR code includes:

detecting a total quantity of angular points contained in the image information;

determining whether the total quantity is greater than a first threshold; and determining that the image information contains the QR code in response to the total quantity being greater than the first threshold.

In some embodiments, after detecting the total quantity of the angular points contained in the image information, the method further includes:

determining that the image information does not contain a QR code in response to the total quantity being less than or equal to the first threshold; and determining the image information without a QR code to be the actual display information.

In some embodiments, before or after determining that the image information does not contain the QR code, the method further includes:

performing binarization processing on the image information to obtain a corresponding binary image;

determining whether the display screen is a black screen according to whether a ratio of a white region in the binary image is less than a preset ratio threshold; and determining a black screen information to be the actual display information in response to the display screen being the black screen.

In some embodiments, the performing binarization processing on the image information to obtain the corresponding binary image includes:

setting a pixel with an actual gray scale value greater than a second threshold in the image information to be a white pixel; and setting a pixel with an actual gray scale value less than the second threshold to be a black pixel to obtain the binary image.

In some embodiments, the second threshold is a product of a difference between a maximum gray scale value and a minimum gray scale value in the image information and a preset coefficient.

In some embodiments, the parsing the QR code contained in the image information to obtain the parse result includes:

parsing the QR code contained in the image information to obtain a first character string;

determining whether the first character string is a unrecognizable code, and determining the first character string to be an invalid character string and setting information with the unidentified QR code as the parse result in response to the first character string being the unrecognizable code; and setting the first character string as the parse result in response to the first character string being not a unrecognizable code.

In some embodiments, the performing verification on the actual display information according to the QR code contained in the image information includes:

comparing the verification information and the actual display information;

passing the verification in response to the actual display information being consistent with the verification information; and failing the verification in response to the actual display information being inconsistent with the verification information.

In some embodiments, after the verification is failed, the method further includes:

determining a current state of the display screen according to the actual display information.

In some embodiments, the determining the current state of the display screen according to the actual display information includes:

determining the current state of the display screen to be a black screen state and sending warning information in response to the actual display information being the black screen information; and determining the current state of the display screen to be a program broadcast error state, issuing the warning information and turning off the display screen in response to the actual display information being the information without a QR code or the information with the unidentified QR code.

In some embodiments, the method further includes:

issuing warning information in response to the verification being failed after being repeatedly performed on the actual display information.

In some embodiments, before performing verification on the actual display information according to the verification information, the method further includes:

obtaining a program broadcast plan made for the display screen;

extracting a second character string of the program that should be currently broadcast from the program broadcast plan, wherein the second character string includes relevant information on verifying authenticity of the program; and generating a corresponding QR code according to the second character string, and using the same as the verification information.

In a second aspect, an embodiment of the present disclosure provides a media monitoring system, including:

a display unit configured to broadcast programs labeled with verification information;

an image collecting unit configured to collect image information of a program verification region corresponding to a current program, wherein the current program is a program that is currently broadcast in the programs by the display unit; and a media monitoring unit configured to obtain corresponding image information from the image collecting unit, and execute the method according to the first aspect.

In some embodiments, the media monitoring system further includes:

a media editing unit configured to edit the programs, set verification information of a corresponding program in the program verification region of the programs, provide the programs set with the verification information to the display unit, and provide the verification information corresponding to each program to the media monitoring unit.

In some embodiments, the image collecting unit includes: an image shooting device, or an image sensor.

In some embodiments, the image sensor is arranged within the display screen.

In some embodiments, the programs include pictures/images and videos.

In a third aspect, an embodiment of the present disclosure provides a media monitoring apparatus, including:

an obtaining unit configured to obtain image information of a program verification region in a display frame of a display screen which is currently monitored, wherein the program verification region is configured to display verification information corresponding to a program that should be currently broadcast on the display screen;

an identifying unit configured to identify the image information to determine actual display information representing a current program which is actually broadcast in the display screen; and a verifying unit configured to perform verification on the actual display information according to the verification information, wherein it is determined that the display screen broadcasts normally in response to the verification being passed, or it is determined that the display screen does not broadcast normally in response to the verification being failed.

In some embodiments, the identifying unit is configured to:

detect whether the image information contains a QR code;

parse the QR code contained in the image information to obtain a parse result in response to, the image information containing the QR code; and determine the parse result to be the actual display information.

In some embodiments, the identifying unit is further configured to:

detect the total quantity of angular points contained in the image information;

determine whether the total quantity is greater than a first threshold; and determine that the image information contains the QR code in response to the total quantity being greater than the first threshold.

In some embodiments, the identifying unit is further configured to:

determine that the image information does not contain a QR code in response to the total quantity being less than or equal to the first threshold; and determine the information without a QR code to be the actual display information.

In some embodiments, the identifying unit is further configured to:

perform binarization processing on the image information to obtain a corresponding binary image;

determine whether the display screen is a black screen according to whether a ratio of a white region in the binary image is less than a preset ratio threshold; and determine black screen information to be the actual display information after determining that the display screen is the black screen.

In some embodiments, the identifying unit is further configured to:

set a pixel with an actual gray scale value greater than a second threshold in the image information to be a white pixel; and set a pixel with an actual gray scale value less than the second threshold to be a black pixel to obtain the binary image.

In some embodiments, the second threshold is a product of a difference between a maximum gray scale value and a minimum gray scale value in the image information and a preset coefficient.

In some embodiments, the identifying unit is further configured to:

parse the QR code contained in the image information to obtain a first character string;

determine whether the first character string is a unrecognizable code, and determine the first character string to be an invalid character string and setting information with the unidentified QR code as the parse result in response to the first character string being the unrecognizable code; and set the first character string as the parse result in response to the first character string is not a unrecognizable code.

In some embodiments, the verifying unit is configured to:

compare the verification information and the actual display information;

pass the verification in response to the actual display information being consistent with the verification information; and fail the verification in response to the actual display information being inconsistent with the verification information.

In some embodiments, the verifying unit is further configured to:

determine a current state of the display screen according to the actual display information.

In some embodiments, the verifying unit is further configured to:

determining the current state of the display screen to be a black screen state and send warning information in response to the actual display information being the black screen information; and determine the current state of the display screen to be a program broadcast error state, issue the warning information and turn off the display screen in response to the actual display information is the information without a QR code or the information with the unidentified QR code.

In some embodiments, the verifying unit is further configured to:

send warning information in response to the verification being failed after being repeatedly performed on the actual display information.

In some embodiments, the apparatus further includes a verification information generating unit. The verification information generating unit is configured to:

obtain a program broadcast plan made for the display screen;

extract a second character string of the current program that should be broadcast from the program broadcast plan, wherein the second character string includes relevant information on verifying authenticity of the programs; and generate a corresponding QR code according to the second character string, and use the same as the verification information.

In a fourth aspect, an embodiment of the present disclosure further provides a media monitoring apparatus, including:

at least one processor; and a memory connected with the at least one processor;

the memory stores an instruction executable by the at least one processor, and the at least one processor executes the instruction stored by the memory to execute the method according to the first aspect.

DETAILED DESCRIPTION OF THE EMBODIMENTS

Embodiments of the present disclosure provide a media monitoring method, apparatus and system as well as a storage medium, to solve the above technical problems in the prior art.

For a better understanding of the above technical solutions, the technical solutions of the present disclosure will be described in detail below through the accompanying drawings and specific embodiments. It should be understood that the embodiments of the present disclosure and specific features in the embodiments are detailed descriptions of the technical solutions of the present disclosure, rather than limitations to the technical solutions of the present disclosure. In the case of no conflict, the embodiments of the present disclosure and the technical features in the embodiments may be combined with one other.

It should be understood that, in the description of the embodiments of the present invention, words such as "first" and "second" are only used for the purpose of distinguishing description, and cannot be interpreted as indicating or implying relative importance, nor can they be understood as indicating or implying a sequence. In the description of the embodiments of the present invention, "a plurality" refers to two or more.

The term "and/or" in the embodiments of the present invention is only a kind of association relationship that describes the associated objects, indicating that there may be three kinds of relationships, for example, A and/or B, may indicate the following three cases: A alone exists, A and B exit at the same time, and B alone exists. In addition, the character "I" herein generally indicates that the related objects are an "or" relationship.

Figure 1:
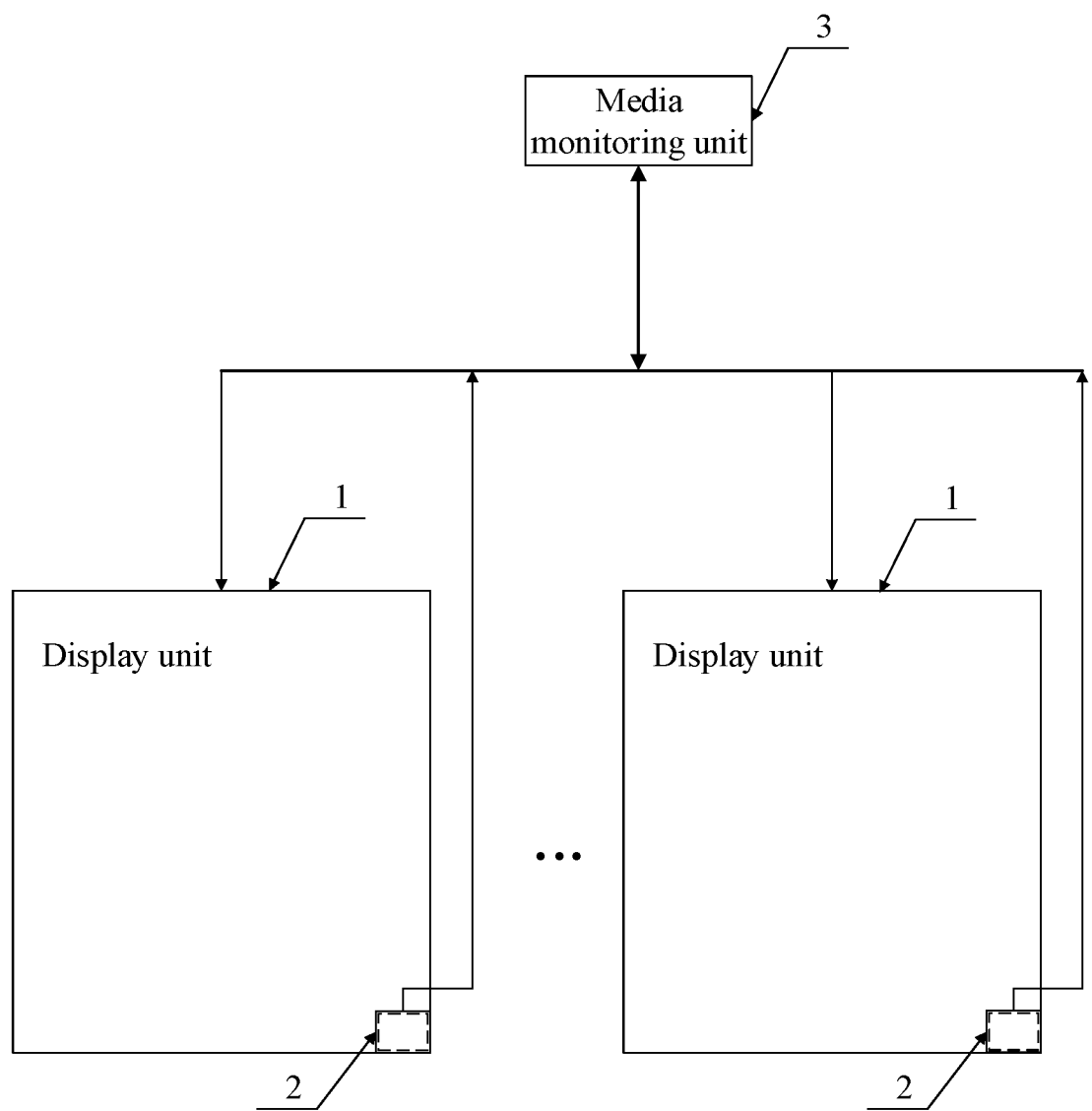
FIG. 1 is a schematic structural diagram of a media monitoring system provided by an embodiment of the present disclosure.

Referring to FIG. 1, FIG. 1 is a schematic structural diagram of a media monitoring system provided by an embodiment of the present disclosure. The media monitoring system includes:

a display unit 1, configured to broadcast to-be-broadcast programs labeled with verification information. The to-be-broadcast programs usually include a plurality of programs, each program includes corresponding verification information, and the to-be-broadcast programs include picture/image videos;

an image collecting unit 2, configured to collect image information of a program verification region corresponding to a current actually-broadcast program broadcast by the display unit 1. The current actually-broadcast program is a program that is currently broadcast in the to-be-broadcast programs. In the media monitoring system, there may be one display unit 1 and one image collecting unit 2, and there may also be a plurality of display units 1 and image collecting units 2, and the display units 1 and the image collecting units 2 are in one-to-one correspondence;

a media monitoring unit 3, configured to obtain corresponding image information from the image collecting unit 2, and execute a media monitoring method. The media monitoring method is introduced in a following method embodiment.

FIG. 1 illustrates a plurality of display units 1. The display units 1 may be screens of advertisement machines or screens of multimedia devices. A fixed position (illustrated by a dotted line defined region in FIG. 1) corresponding to the program verification region in each display unit 1 is configured to display the verification information of the program verification region in a display frame of the display unit 1. The following information may be known from the verification information: a program label of a current program that should be broadcast, a program sequence, a label of a device broadcasting the program, a label of a program broadcast plan to which the program belongs, a plan category, etc.

The image collecting unit 2 is arranged at the fixed position corresponding to the program verification region in each display unit 1. The image collecting unit 2 may be an image shooting device, such as a camera, and the image shooting device may be installed at a position right opposite to a designated region on a surface of the display unit 1. Installing image shooting devices on surfaces of display units 1 is conducive to monitoring existing display units 1.

The image collecting unit 2 may also be an image sensor, such as an optical sensor. The image sensor may be arranged at the designated region of the display unit 1 and serves as one of components of the display unit 1. By arranging the image sensor in the display unit 1, the display unit 1 may be more attractive in appearance.

The image collecting unit 2 transmits collected image information of the program verification region to the media monitoring unit 3 and it is monitored in real time whether the display unit 1 broadcasts a program normally through the media monitoring method in the media monitoring unit 3, so that relevant processing may be performed when broadcast is abnormal, thus improving accuracy of program broadcast of the display unit 1. Actual display information may be first character string information corresponding to a Quick Response, QR code, or may be black screen information on appearance of a black screen in the display unit 1, or may also be information without a QR code or with an unidentified QR code in the program verification region.

The display unit 1, the image collecting unit 2 and the media monitoring unit 3 may be devices independent from one another, or may be the same device. For example, they may be located in the same advertisement machine, or it may be that one display unit 1 and one image collecting unit 2 belong to one advertisement machine while a plurality of advertisement machines correspond to one media monitoring unit 3; or it may also be that the display unit 1 belongs to an advertisement machine, the image collecting unit 2 is an independent device, and the media monitoring unit 3 is also an independent device. Of course, the media monitoring unit 3 may also be divided into a plurality of different devices by function.

Figure 2:
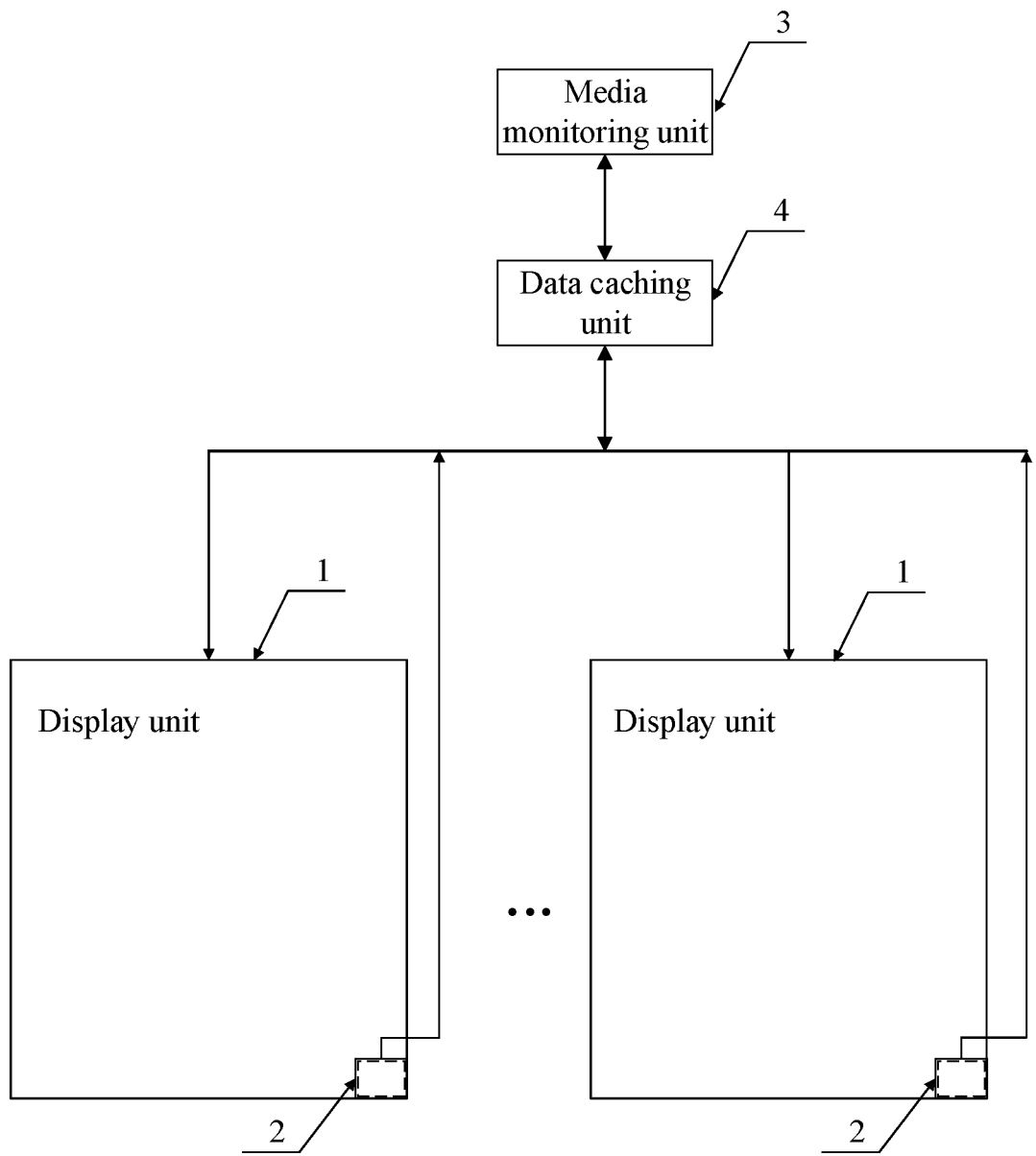
FIG. 2 is a schematic structural diagram of another media monitoring system provided by an embodiment of the present disclosure.

Referring to FIG. 2, FIG. 2 is a schematic structural diagram of another media monitoring system provided by an embodiment of the present disclosure. The media monitoring system further includes:

a data caching unit 4, configured to store the image information of the program verification region in the display screen corresponding to the display unit 1 obtained from the image collecting unit 2, and provide the image information to the media monitoring unit 3.

When a plurality of the display units 1 are arranged, a data volume of the image information collected by the image collecting unit 2 is huge. By arranging the data caching unit 4 in the monitoring system to store the image information collected by the image collecting unit 2, the media monitoring unit 3 may read the image information from the data caching unit 4 according to its own data processing capability, so data congestion can be prevented and stability of the media monitoring 3 can be improved.

Figure 3:
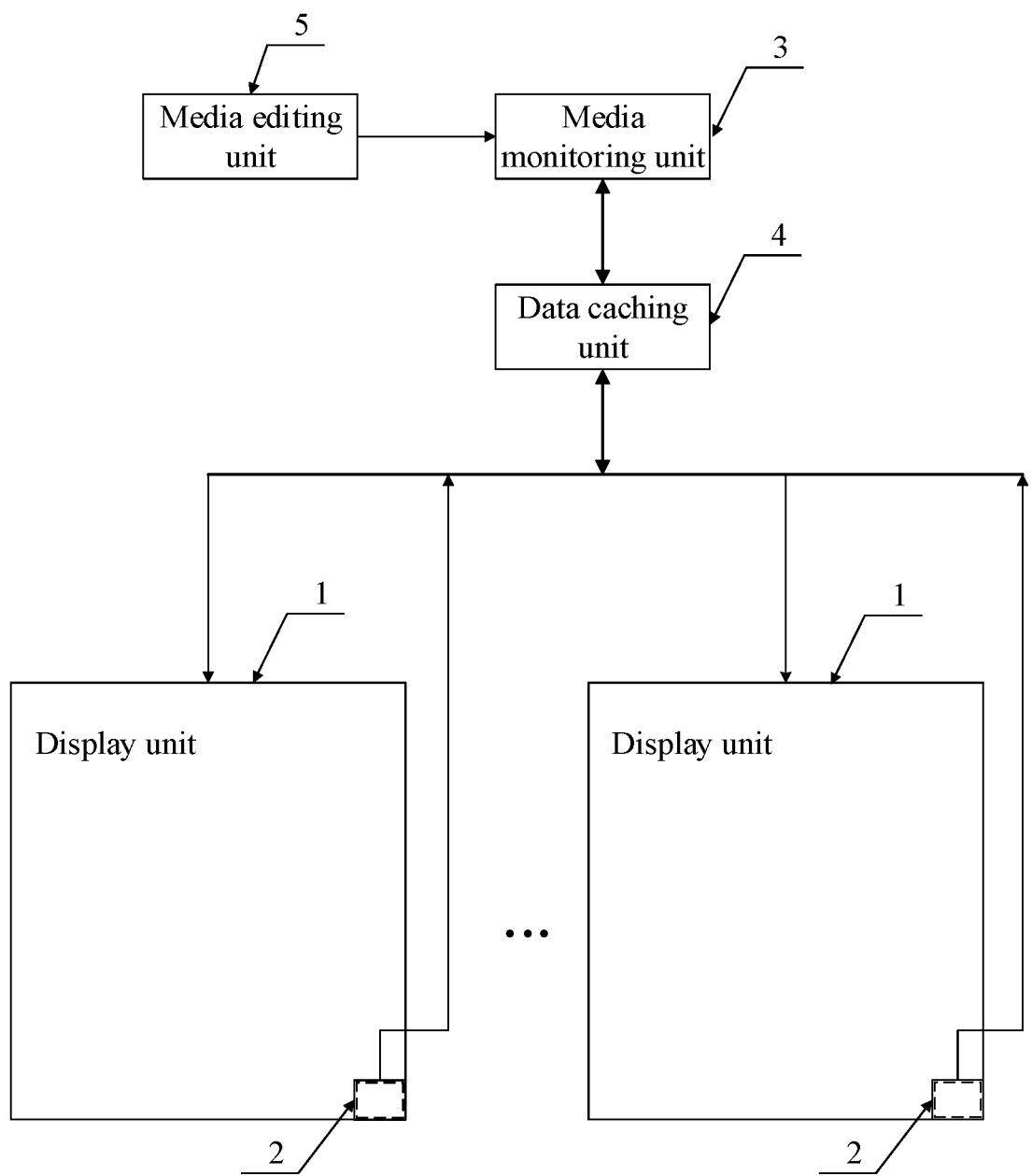
FIG. 3 is a schematic structural diagram of yet another media monitoring system provided by an embodiment of the present disclosure.

Referring to FIG. 3, FIG. 3 is a schematic structural diagram of yet another media monitoring system provided by an embodiment of the present disclosure. The media monitoring system further includes:

a media editing unit 5, configured to edit the to-be-broadcast programs, set verification information of a corresponding program in the program verification region of the to-be-broadcast programs, provide the to-be-broadcast programs set with the verification information to the display unit 1, and provide the verification information corresponding to each program to the media monitoring unit 3.

For example, a user needs to make an advertisement program to be broadcast in an advertisement machine in a certain subway line. The user may edit the to-be-broadcast programs (for example, including programs 1-10) in the media editing unit 5, set corresponding verification information in program verification regions of the programs 1-10, provide the to-be-broadcast programs set with the verification information to the display unit 1 to be broadcast, and provide the verification information corresponding to each program to the media monitoring unit 3.

After introducing structural composition of the media monitoring system, the media monitoring method used by the media monitoring unit 3 in the above media monitoring system will be introduced below.

Figure 4:
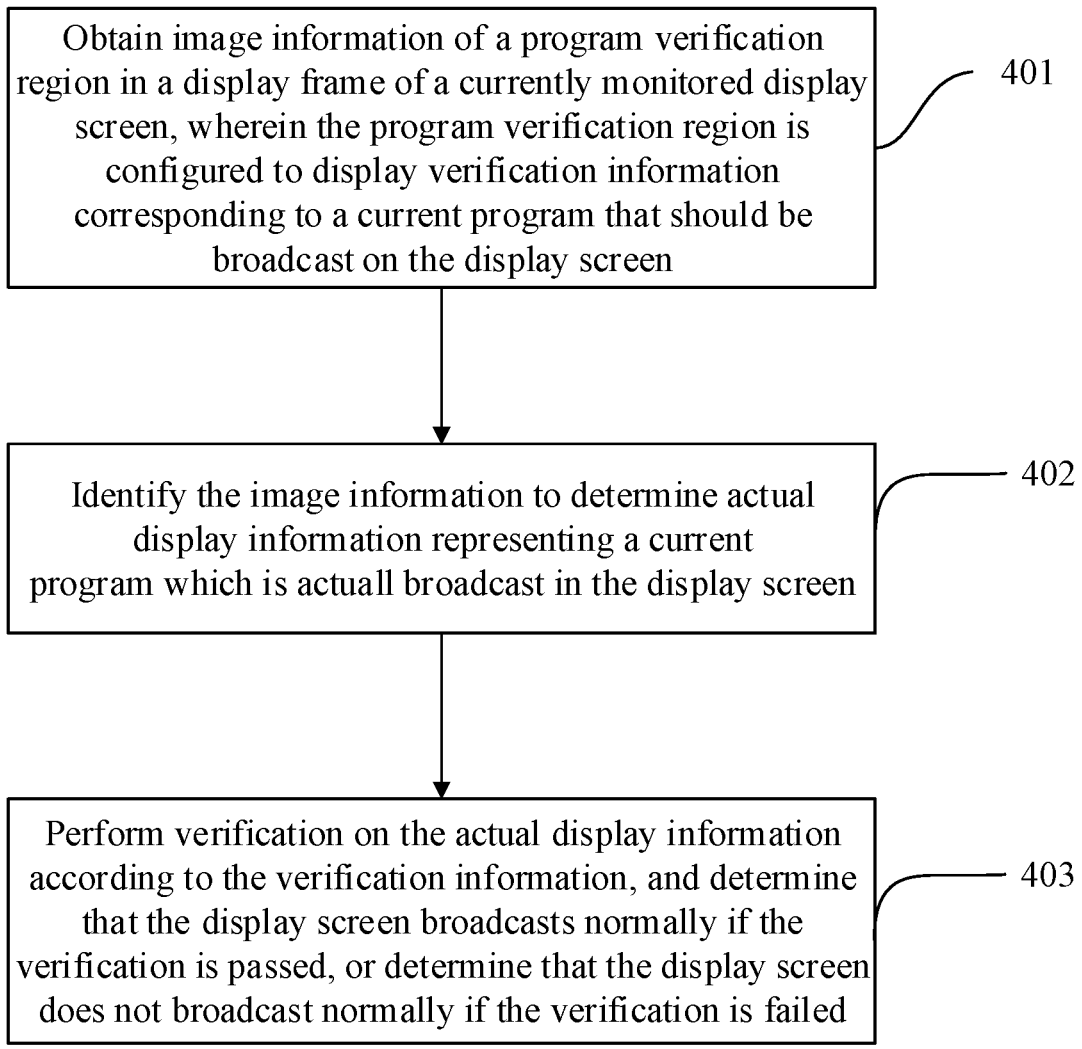
FIG. 4 is a flow chart of a media monitoring method provided by an embodiment of the present disclosure.

Referring to FIG. 4, FIG. 4 is a flow chart of a media monitoring method provided by an embodiment of the present disclosure. Based on the same inventive concept, one embodiment of the present disclosure provides a media monitoring method. A processing process of the method is as follows.

Step 401: image information of a program verification region in a display frame of a currently monitored display screen is obtained. The program verification region is configured to display verification information corresponding to a current program that should be broadcast on the display screen.

When the display screen (i.e. a display unit 1) is broadcasting a program, a media monitoring unit 3 may direction obtain the image information of the program verification region in the display frame of the display screen from an image collecting unit 2, and may also obtain the image information of the program verification region in the display frame of the display screen from other devices connected with the image collecting unit 2. The image information may be a QR code image, or may be an non-QR code image, such as an image of text, symbols, or a black screen.

Step 402 may be executed after the image information is obtained.

Step 402: the image information is identified to determine actual display information representing a program which is currently broadcast in the display screen.

The identifying the image information to determine the actual display information representing the program which is currently broadcast in the display screen may be implemented through the following manner:

whether the image information contains a QR code is detected; if the image information contains the QR code, the QR code contained in the image information is parsed to obtain a parse result; and the parse result is determined to be the actual display information.

Figure 5:
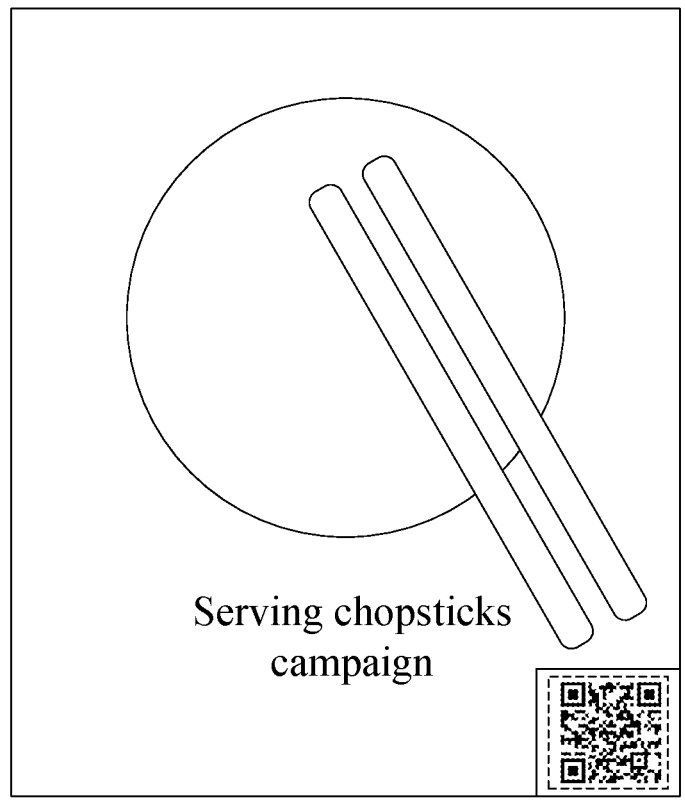
FIG. 5 is a schematic diagram of a display screen broadcasting a current program that should be broadcast providing by an embodiment of the present disclosure.
Figure 6:
FIG. 6 is a schematic diagram of image information of a program verification region in a display screen provided by an embodiment of the present disclosure.

Referring to FIG. 5 and FIG. 6, FIG. 5 is a schematic diagram of a display screen broadcasting a current program that should be broadcast providing by an embodiment of the present disclosure and FIG. 6 is a schematic diagram of image information of a program verification region in a display screen provided by an embodiment of the present disclosure.

The current program that should be broadcast by the display screen (a corresponding device label is "DEVICE 1") is a public service advertisement on "serving chopsticks campaign" (a program label is "public service advertisement 2"). The public service advertisement is in a program broadcast plan 1 (a label is "JX1") and is ranked as a third program (a corresponding label is "03"), the above information constitute a second character string ("JX1, 03, public service advertisement 2, DEVICE 1"), and a QR code generated according to the second character string is used as the verification information to be displayed in the program verification region of the current program that should be broadcast. The image collecting unit performs image collection on the program verification region in the display frame of the display screen, obtains the corresponding image information (as show in FIG. 6, a picture), and transmit the same to the media monitoring unit.

The media monitoring unit detects whether the image information contains a QR code. If yes, the QR code contained in the image information is parsed, an obtained parse result is: "JX1, 03, public service advertisement 2, DEVICE 1", and the parse result is determined to be the actual display information representing the current actually-broadcast program in the display screen.

In some embodiments, the detecting whether the image information contains the QR code may be implemented by the following manner:

the total quantity of angular points contained in the image information is detected; whether the total quantity is greater than a first threshold is judged; and if yes, it is determined that the image information contains the QR code.

In some embodiments, after detecting the total quantity of the angular points contained in the image information, if the total quantity is less than or equal to the first threshold, it is determined that the image information does not contain a QR code; and the information without a QR code is determined to be the actual display information.

The step of detecting the total quantity of the angular points contained in the image information, may be implemented by an angular point detection algorithm.

Figure 7:
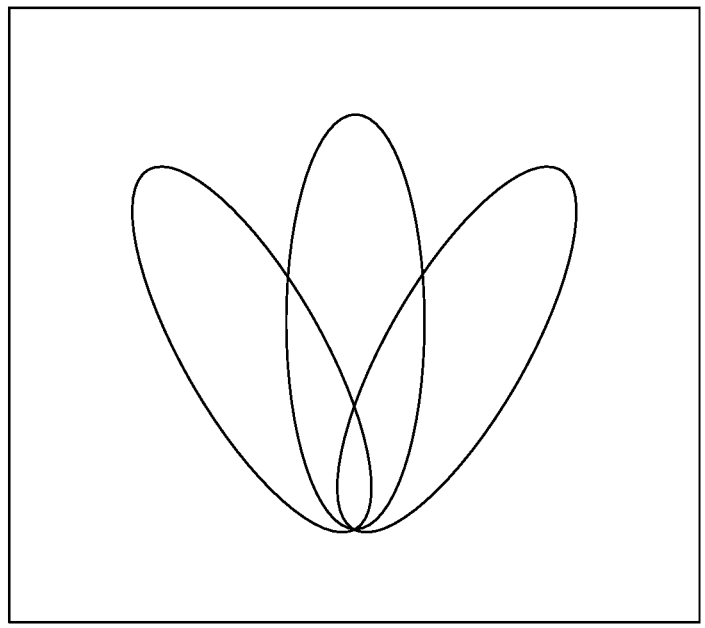
FIG. 7 is a schematic diagram of image information provided by an embodiment of the present disclosure.

For example, referring to FIG. 7, FIG. 7 is a schematic diagram of image information provided by an embodiment of the present disclosure. Assuming that a device where the display screen is located is hacked by a hacker and content displayed by the display screen is changed into other content, the collected image information of the program verification region is as shown in FIG. 7, and the first threshold is assumed to be 60.

The angular point detection algorithm is adopted to detect the image information shown in FIG. 7, it is determined that the total quantity of the angular points contained therein is 4 (i.e. less than 60), and it may be determined that the image information shown in FIG. 7 does not contain a QR code. At the moment, the information without a QR code is determined to be the actual display information representing the current actually-broadcast program in the display screen.

For another example, the angular point detection algorithm is adopted to detect the image information shown in FIG. 6, it is determined that the total quantity of the angular points contained therein is 200 (greater than 60), and it may be determined that the image information shown in FIG. 6 contains a QR code.

Because a black screen may appear in the display screen during display, it may further be determined whether the display screen is a black screen through the image information. Before or after determining that the image information does not contain a QR code, it may be determined whether the display screen is a black screen through the following manner:

binarization processing is performed on the image information to obtain a corresponding binary image; whether the display screen is a black screen is determined according to whether a ratio of a white region in the binary image is less than a preset ratio threshold; and black screen information is determined to be the actual display information after determining that the display screen is the black screen.

For example, after the image information is subjected to binarization processing to be the binary image, an area of the white region may be determined, a ratio of the area of the white region to an area of the binary image is determined to be the ratio of the white region, it is judged whether the rate is less than the preset ratio threshold (which is assumed to be 0.005), and if the ratio is less than the ratio threshold, it is determined that the display screen is the black screen and the black screen information is determined to be the actual display information. Because pixels in the white region are all white pixels, in the above processing process, the quantity of the white pixels in the binary image may be counted, and a ratio of the quantity of the white pixels to the total quantity of pixels in the binary image is set as the ratio of the white region.

In some embodiments, the step of performing binarization processing on the image information to obtain the corresponding binary image may be implemented through the following manner:

a pixel with an actual gray scale value greater than a second threshold in the image information is set to be a white pixel; and a pixel with an actual gray scale value less than the second threshold is set to be a black pixel to obtain the binary image.

For example, assuming that the second threshold is M, pixels with the actual gray scale value greater than M in the image information are set to be white pixels, and the rest is set to be black pixels, thus obtaining the binary image.

A value range of the second threshold is 0.005-0.01.

The second threshold may be an experience value, or may be a product of a difference between a maximum gray scale value and a minimum gray scale value in the image information and a preset coefficient.

For example, the maximum gray scale value and the minimum gray scale value are obtained from the image information, and the product of the difference between them and the preset coefficient is determined to be the second threshold, which may be represented by a formula that:

$$M=(G_{max}-G_{min}) \times k,$$

where M is the second threshold, $G_{max}$ and $G_{min}$ are respectively the maximum gray scale value and the minimum gray scale value in the image information, k is the preset coefficient, and a value range of k is 0.4-0.6.

If it is determined that the image information contains the QR code, the parsing the QR code contained in the image information to obtain the parse result may be implemented through the following manner:

the QR code contained in the image information is parsed to obtain a first character string; whether the first character string is a unrecognizable code is judged, and if the first character string is the unrecognizable code, the first character string is determined to be an invalid character string and information with the unidentified QR code is set as the parse result; and if the first character string is not a unrecognizable code, the first character string is set as the parse result.

For example, the QR code contained in the image information is parsed; if the obtained first character string is the unrecognizable code, it may be determined that the first character string is an invalid character string, and the QR code contained in the corresponding image information is an unidentified QR code; and at the moment, the information with the QR code unidentified is set as the parse result, and the actual display information is determined to be the information with the QR code unidentified. If the image information is the image information shown in FIG. 6, the parsed first character string is "JX1, 03, public service advertisement 2, DEVICE 1", it may be determined that the first character string is not a unrecognizable code, "JX1, 03, public service advertisement 2, DEVICE 1" is set as the parse result of the QR code contained in the image information, and the actual display information is determined to be "JX1, 03, public service advertisement 2, DEVICE 1".

After obtaining the actual display information of the display screen, step 403 may be executed.

Step 403: verification is performed on the actual display information according to the verification information, and it is determined that the display screen broadcasts normally if the verification is passed, or it is determined that the display screen does not broadcast normally if the verification is failed.

In some embodiments, the image information of the program verification region of the display frame of the currently monitored display screen is obtained; the program verification region is configured to display the verification information corresponding to the current program that should be broadcast on the display screen; the image information is identified to determine the actual display information representing the current actually-broadcast program in the display screen; and the verification is performed on the actual display information according to the verification information, and it is determined that the display screen broadcasts normally if the verification is passed, or it is determined that the display screen does not broadcast normally if the verification is failed, so that programs actually broadcast by the display screen may be monitored through the content displayed in the program verification region, thus improving accuracy of program broadcast. In addition, by identifying the image information of the program verification region of the display screen, existing abnormalities of the display screen may also be timely found, such as black screen, being hacked (no QR code, or unidentified QR code), etc., and relevant technicians may be reminded of processing these abnormalities, so the accuracy of program broadcast is improved.

In some embodiments, the performing verification on the actual display information according to the verification information may be implemented through the following manner:

the verification information and the actual display information are compared; the verification is passed if the actual display information is consistent with the verification information; and the verification is failed if the actual display information is inconsistent with the verification information.

In the above comparison process, if the verification information and the actual display information are information of the same category (for example, both are image information), similarity between two images may be calculated to determine whether the verification is passed; and if the verification information and the actual display information are not information of the same category, for example, the verification information is a QR code and the actual display information is a character string, they may be converted into information of the same category before comparison.

For example, taking the example in FIG. 5 as an example, the actual display information representing the current actually-broadcast program in the display screen is identified to be "JX1, 03, public service advertisement 2, DEVICE 1" through the collected image information of the program verification region, and a second character string corresponding to the verification information (a QR code) of the current program that should be broadcast by the display screen is "JX1, 03, public service advertisement 2, DEVICE 1"; and by comparison, it may be known that the second character string is consistent with the actual display information, and it is determined that the verification is passed, which indicates that the current actually-broadcast program in the display screen is consistent with the current program that should be broadcast and that the display screen broadcasts normally.

For another example, after a period of time, the actual display information representing the current actually-broadcast program in the display screen is identified to be "black screen" through the collected image information of the program verification region, the second character string "JX1, 03, public service advertisement 2, DEVICE 1" is compared with "black screen", it is determined that the second character string is inconsistent with the actual display information, and it is determined that the verification is failed, which indicates that the current actually-broadcast program in the display screen is inconsistent with the current program that should be broadcast and that the display screen broadcasts abnormally.

In some embodiments, after the verification is failed, a current state of the display screen may be determined according to the actual display information. The current state may be a black screen state, may be a program broadcast error state, or may be other states.

For example, in the above example, after it is determined that the verification is failed, the current state of the display screen may be determined to be the black screen state according to the actual display information.

The determining the current state of the display screen according to the actual display information may be implemented through the following manner:

if the actual display information is the black screen information, the current state of the display screen is determined to be the black screen state and warning information is sent; and if the actual display information is the information without a QR code or the information with the unidentified QR code, the current state of the display screen to be the program broadcast error state (abnormal broadcast), the warning information is issued and the display screen is turned off.

For example, when the actual display information is the black screen information, it may be determined that the current state of the display screen is black screen, the warning information is sent, the warning information may be acousto-optic information, short message, text information, etc. After obtaining the above warning information, the relevant technical personnel may eliminate a fault of the display screen in time.

When the actual display information is the information without a QR code or with an unidentified QR code, it may be determined that the current state of the display screen is the program broadcast error state, the warning information is sent, and the display screen is turned off. In this way, broadcast of a wrong program may be prevented, the relevant technical personnel may timely find out a reason for the wrong program in time according to the warning information, so that the display screen may broadcast a correct program.

In some embodiments, if the verification is repeatedly performed on the actual display information and is failed, the warning information is sent.

The warning information is sent only when the verification is repeatedly performed on the actual display information and is failed, so that normal broadcast of the display screen may be prevented from influence caused by occasional errors, thus improving the accuracy of program broadcast of the display screen.

In some embodiments, before performing verification on the actual display information according to the verification information, the method further includes:
a program broadcast plan made for the display screen is obtained; a second character string of the current program that should be broadcast is extracted from the program broadcast plan, where the second character string includes relevant information on verifying authenticity of the current to-be-broadcast program; and a corresponding QR code is generated according to the second character string to be the verification information. The verification information is arranged to be in the program verification region of the corresponding program in the to-be-broadcast programs, so when the program is broadcast, the corresponding verification information may be displayed in the program verification region.

For example, taking FIG. 5 as an example, when a user uses a media editing unit to edit the to-be-broadcast programs and the program broadcast plan, the media editing unit sends the program broadcast plan to a media monitoring unit, the media monitoring unit extracts the relevant information on verifying authenticity of the current to-be-broadcast program from the program broadcast plan: "JX1, 03, public service advertisement 2, DEVICE 1", which is used as the second character string, and the QR code is generated thereon to be the verification information used for verification.

A process of the media editing unit editing the verification information of each program in the to-be-broadcast programs is similar to above embodiments. Of course, the verification information of each program in the to-be-broadcast programs may also be directly provided by the media editing unit to a media monitoring apparatus, so that the media monitoring apparatus only needs to obtain the corresponding verification information for verification according to a program label.

Figure 8:
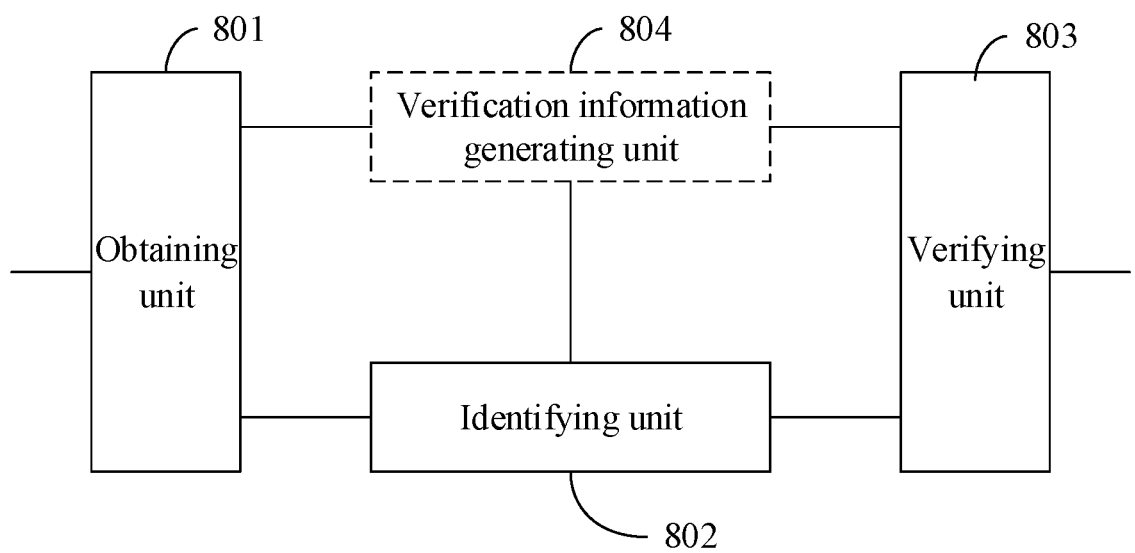
FIG. 8 is a schematic structural diagram of a media monitoring apparatus provided by an embodiment of the present disclosure.

Based on the same inventive concept, an embodiment of the present disclosure provides a media monitoring apparatus. For specific implementation of a media monitoring method of the apparatus, reference may be made to the description of the embodiment of the media monitoring method, and repetition will not be made. Referring to FIG. 8, the apparatus includes:

an obtaining unit 801, configured to obtain image information of a program verification region in a display frame of a currently monitored display screen, where the program verification region is configured to display verification information corresponding to a current program that should be broadcast on the display screen;

an identifying unit 802, configured to identify the image information to determine actual display information representing a program which is currently broadcast in the display screen; and a verifying unit 803, configured to perform verification on the actual display information according to the verification information, where it is determined that the display screen broadcasts normally if the verification is passed, or it is determined that the display screen does not broadcast normally if the verification is failed.

In some embodiments, the identifying unit 802 is configured to:
detect whether the image information contains a QR code;
parse, if the image information contains the QR code, the QR code contained in the image information to obtain a parse result; and
determine the parse result to be the actual display information.

In some embodiments, the identifying unit 802 is further configured to:
detect the total quantity of angular points contained in the image information;
determine whether the total quantity is greater than a first threshold; and
determine, if yes, that the image information contains the QR code.

In some embodiments, the identifying unit 802 is further configured to:
determine, if the total quantity is less than or equal to the first threshold, that the image information does not contain a QR code; and
determine the information without a QR code to be the actual display information.

In some embodiments, the identifying unit 802 is further configured to:
perform binarization processing on the image information to obtain a corresponding binary image;
determine whether the display screen is a black screen according to whether a ratio of a white region in the binary image is less than a preset ratio threshold; and
determine black screen information to be the actual display information after determining that the display screen is the black screen.

In some embodiments, the identifying unit 802 is further configured to:
set a pixel with an actual gray scale value greater than a second threshold in the image information to be a white pixel; and
set a pixel with an actual gray scale value less than the second threshold to be a black pixel to obtain the binary image.

In some embodiments, the second threshold is a product of a difference between a maximum gray scale value and a minimum gray scale value in the image information and a preset coefficient.

In some embodiments, the identifying unit 802 is further configured to:
parse the QR code contained in the image information to obtain a first character string;
determine whether the character string contained in the image information is a unrecognizable code, and if the first character string is the unrecognizable code, determining the first character string to be an invalid character string and setting information with the unidentified QR code as the parse result; and set, if the first character string is not a unrecognizable code, the first character string as the parse result.

In some embodiments, the verifying unit 803 is configured to:

compare the verification information and the actual display information;

pass the verification if the actual display information is consistent with the verification information; and fail the verification if the actual display information is inconsistent with the verification information.

In some embodiments, the verifying unit 803 is further configured to:

determine a current state of the display screen according to the actual display information.

In some embodiments, the verifying unit 803 is further configured to:

determining, if the actual display information is the black screen information, the current state of the display screen to be a black screen state and send warning information; and determine, if the actual display information is the information without a QR code or the information with the unidentified QR code, the current state of the display screen to be a program broadcast error state, issue the warning information and turn off the display screen.

In some embodiments, the verifying unit 803 is further configured to:

send warning information if the verification is repeatedly performed on the actual display information and is failed.

In some embodiments, the apparatus further includes a verification information generating unit 804. The verification information generating unit 804 is configured to:

obtain a program broadcast plan made for the display screen;

extract a second character string of the current program that should be broadcast from the program broadcast plan, where the second character string includes relevant information on verifying authenticity of the current to-be-broadcast program; and generate a corresponding QR code according to the second character string, and use the same as the verification information.

Based on the same inventive concept, an embodiment of the present disclosure provides a media monitoring apparatus, including: at least one processor; and a memory connected with the at least one processor.

The memory stores an instruction executable by the at least one processor, and the at least one processor executes the instruction stored by the memory to execute the above media monitoring method.

Those of skill in the art should understand that embodiments of the present disclosure may be provided as a method, system, or computer program product. Accordingly, the embodiments of the present disclosure may take the form of an entirely hardware embodiment, an entirely software embodiment, or an embodiment combining software and hardware aspects. Furthermore, the embodiments of the present disclosure may take the form of a computer program product implemented on one or more computer-usable storage media containing computer-usable program codes therein, including but not limited to a disk memory, a CD-ROM, an optical memory, and the like.

The embodiments of the present disclosure are described with reference to flowchart and/or block diagrams of methods, apparatuses (systems), and computer program products according to the embodiments of the present disclosure. It should be understood that each flow and/or block in the flowcharts and/or block diagrams, and combinations of flows and/or blocks in the flowcharts and/or block diagrams, can be combined by computer program instructions. These computer program instructions may be provided to a processor of a general purpose computer, a special purpose computer, an embedded processor or other programmable data processing device to produce a machine such that the instructions executed by the processor of the computer or other programmable data processing device produce an apparatus for implementing functions specified in one or more flows of the flowcharts and/or one or more blocks of the block diagrams.

These computer program instructions may also be stored in a computer-readable memory capable of directing a computer or other programmable data processing apparatus to operate in a particular manner, such that the instructions stored in the computer-readable memory result in an article of manufacture including instruction apparatuses. The instruction apparatuses implement the functions specified in one or more flows of the flowcharts and/or one or more blocks of the block diagrams.

These computer program instructions can also be loaded on a computer or other programmable data processing device, so that a series of operational steps are performed on the computer or other programmable device to produce a computer-implemented process. Therefore, instructions executed on the above computer or other programmable device provide steps for implementing the functions specified in one or more flows of the flowcharts and/or one or more blocks of the block diagrams.

Obviously, those of skill in the art can make various changes and modifications to the present disclosure without departing from the spirit and scope of the present disclosure.

Thus, if these changes and modifications of the present disclosure fall within the scope of the claims of the present disclosure and their equivalents, the present disclosure is also intended to include these modifications and variations.

What is claimed is:

1. A media monitoring method, comprising:

obtaining image information of a program verification region in a display frame of a display screen which is currently monitored, wherein the program verification region is configured to display verification information corresponding to a program that should be currently broadcast on the display screen;

identifying the image information to determine an actual display information representing a current program which is actually broadcast in the display screen; and performing a verification on the actual display information according to the verification information, and determining that the display screen broadcasts normally in response to the verification passing, determining that the display screen does not broadcast normally in response to the verification failure;

wherein the identifying the image information to determine the actual display information representing the current program comprises: detecting whether the image information contains a Quick Response, OR code; parsing the QR code to obtain a parse result in response to the image information containing the QR code; and determining the parse result to be the actual display information;

wherein the detecting whether the image information contains the QR code comprises: detecting a total quantity of angular points contained in the image information: determining whether the total quantity is greater than a first threshold; and determining that the image information contains the QR code in response to the total quantity being greater than the first threshold;

wherein after detecting the total quantity of the angular points contained in the image information, the method further comprises: determining that the image information does not contain the QR code in response to the total quantity being less than or equal to the first threshold; and determining the image information without a QR code to be the actual display information;

wherein before or after determining that the image information does not contain the QR code, the method further comprises: performing binarization processing on the image information to obtain a corresponding binary image; determining whether the display screen is a black screen according to whether a ratio of a white region in the binary image is less than a preset ratio threshold; and determining a black screen information to be the actual display information in response to the display screen being the black screen;

wherein the performing binarization processing on the image information to obtain the corresponding binary image comprises: setting a pixel with an actual gray scale value greater than a second threshold in the image information to be a white pixel; and setting a pixel with an actual gray scale value less than the second threshold to be a black pixel to obtain the binary image.

2. The method according to claim 1, wherein the second threshold is a product of a difference between a maximum gray scale value and a minimum gray scale value in the image information and a preset coefficient.

3. The method according to claim 1, wherein the parsing the QR code to obtain the parse result comprises:
parsing the QR code contained in the image information to obtain a first character string;
determining whether the first character string is an unrecognizable code, and determining the first character string to be an invalid character string and setting information with an unidentified QR code as the parse result in response to the first character string being the unrecognizable code; and
setting the first character string as the parse result in response to the first character string being not an unrecognizable code.

4. The method according to claim 3, wherein the performing verification on the actual display information according to the verification information comprises:
comparing the verification information and the actual display information;
passing the verification in response to the actual display information being consistent with the verification information; and
failing the verification in response to the actual display information being inconsistent with the verification information.

5. The method according to claim 4, wherein after the verification is failed, the method further comprises:
determining a current state of the display screen according to the actual display information.

6. The method according to claim 5, wherein the determining the current state of the display screen according to the actual display information comprises:

determining the current state of the display screen to be a black screen state and issuing warning information in response to the actual display information being the black screen information; and
determining the current state of the display screen to be a program broadcast error state, issuing the warning information and turning off the display screen in response to the actual display information being the information without a QR code or the information with the unidentified QR code.

7. The method according to claim 4, further comprising:
issuing warning information in response to the verification failure after being repeatedly performed on the actual display information.

8. The method according to claim 4, wherein before performing verification on the actual display information according to the verification information, the method further comprises:
obtaining a program broadcast plan made for the display screen;
extracting a second character string of the program that should be currently broadcast from the program broadcast plan, wherein the second character string comprises relevant information on verifying authenticity of the program; and
generating a corresponding QR code according to the second character string, and using the corresponding QR code as the verification information.

9. A media monitoring apparatus, comprising:
at least one processor; and
a memory connected with the at least one processor, wherein
the memory stores an instruction executable by the at least one processor, and the at least one processor executes the instruction stored by the memory to perform followings:
obtaining image information of a program verification region in a display frame of a display screen which is currently monitored, wherein the program verification region is configured to display verification information corresponding to a program that should be currently broadcast on the display screen;
identifying the image information to determine an actual display information representing a current program which is actually broadcast in the display screen; and
performing a verification on the actual display information according to the verification information, and determining that the display screen broadcasts normally in response to the verification passing, determining that the display screen does not broadcast normally in response to the verification failure;
wherein the at least one process further executes the instruction stored by the memory to perform followings: detecting whether the image information contains a Quick Response, QR code; parsing the QR code to obtain a parse result in response to the image information containing the QR code; and determining the parse result to be the actual display information;
wherein the at least one processor executes the instruction stored by the memory to detect whether the image information contains the QR code comprises: detecting a total quantity of angular points contained in the image information; determining whether the total quantity is greater than a first threshold; and determining that the image information contains the OR code in response to the total quantity being greater than the first threshold;

wherein after detecting the total quantity of the angular points contained in the information, the method further comprises: determining that the image information does not contain the QR code in response to the total quantity being less than or equal to the first threshold; and determining the image information without a OR code to be the actual display information;

wherein before or after determining that the image information does not contain the OR code, the method further comprises: performing binarization processing on the image information to obtain a corresponding binary image: determining whether the display screen is a black screen according to whether a ratio of a white region in the binary image is less than a preset ratio threshold; and determining a black screen information to be the actual display information in response to the display screen being the black screen;

wherein the performing binarization processing on the image information to obtain the corresponding binary image comprises: setting a pixel with an actual gray scale value greater than a second threshold in the image information to be a white pixel; and setting a pixel with an actual gray scale value less than the second threshold to be a black pixel to obtain the binary image.

10. The media monitoring apparatus according to claim 9, wherein the second threshold is a product of a difference between a maximum gray scale value and a minimum gray scale value in the image information and a preset coefficient.

\* \* \* \* \*